(12) United States Patent
Gregg et al.

(10) Patent No.: US 6,843,744 B2
(45) Date of Patent: Jan. 18, 2005

(54) SPLICING JOINT AND METHOD FOR SYNCHRONOUS DRIVE BELT

(75) Inventors: Michael John William Gregg, Lincoln, NE (US); Hong Xuan Nguyen, Lincoln, NE (US)

(73) Assignee: The Goodyear Tire & Rubber Company, Akron, OH (US)

(*) Notice: Subject to any disclaimer, the term of this patent is extended or adjusted under 35 U.S.C. 154(b) by 110 days.

(21) Appl. No.: 10/324,904

(22) Filed: Dec. 19, 2002

(65) Prior Publication Data

US 2004/0121868 A1 Jun. 24, 2004

(51) Int. Cl.$^7$ ................................................. F16G 3/10
(52) U.S. Cl. ........................................ 474/254; 474/218
(58) Field of Search .............................. 474/204, 205, 474/218, 254; 156/137, 304.1, 304.2, 304.6

(56) References Cited

U.S. PATENT DOCUMENTS 3,342,656 A * 9/1967 Papageorges ............... 156/159
3,650,874 A * 3/1972 Job et al. .................... 138/145
3,964,328 A * 6/1976 Redmond, Jr. ............... 474/205

\* cited by examiner

*Primary Examiner*—David A. Bucci
*Assistant Examiner*—Vicky A. Johnson
(74) *Attorney, Agent, or Firm*—Richard B. O'Planick

(57) ABSTRACT

A splice joint is for joining first and second synchronous drive belt ends, of the belt type comprising a reinforcement material layer covering a base layer formed from a first thermoplastic material. The joint comprises a fused portion of the base layer of the first and second belt ends that define a splice region. At least one coating layer of thermoplastic material overlaps the reinforcement layer of the end portions in the splice region. The coating layer is comprised of a second elastomeric material intended to melt and penetrate into interstices of the reinforcement material layer while within the mold press. Migration of the base layer material through the reinforcement material layer to the pulley-engaging outer surface is thereby inhibited. The second elastomeric material composing the coating layer may be selected to provide desired frictional and wear characteristics.

19 Claims, 5 Drawing Sheets

SPLICING JOINT AND METHOD FOR SYNCHRONOUS DRIVE BELT

FIELD OF THE INVENTION

The present invention relates generally to a synchronous drive belt and specifically to a splicing joint and method for connecting opposite ends of a drive belt together to form an uninterrupted loop.

BACKGROUND OF THE INVENTION

Conventional synchronous drive belts are known in the industry and find utility in sundry applications. Such belts include a resilient elastomeric base layer reinforced with longitudinal tensile members. The belt base layer is typically formed of a suitably strong yet pliable material such as polyurethane. A series of teeth are formed along the base layer to sequentially engage corresponding pulley cavities. The tooth surface may be reinforced, if required, with an abrasion resistant fabric such as nylon. U.S. Pat. Nos. 4,679,459; 4,951,261; 5,209,705; and 5,421,789 are representative of the state of the art in synchronous drive belt structures.

Synchronous belting made from thermoplastic elastomer is often made in open ended long continuous lengths. The toothed side of the belt is covered with the fabric that conforms to the shape of the tooth surface. Such belting may be joined or spliced into an endless or loop configuration by cutting finger patterns in the ends to be joined. The fingers may take the form of elongated chevrons or square castellations, patterns known in the art.

Pursuant to current state of the art practice, the ends of the belt or belts to be joined are placed in a mold having a toothed molding surface that corresponds to the configuration and spacing of the belt teeth. The ends are in close contact in the mold and the mold is closed. The center portion of the mold is heated above the thermoplastic melting point and pressure is applied. The ends of the belt and, specifically the thermoplastic base layer melt and fuse together. The mold is then cooled and opened. The resultant belt is thereby rendered endless and the mold may be reused in similar subsequent belt splicing sequences.

While the aforementioned splice and splicing method works well and results in a belt having the desired shape and functional strength at the splice joint, several undesirable consequences are unavoidable from the practice of this state of the art methodology. First, during the fusion procedure, the molten thermoplastic belt base layer material tends to penetrate into and through the interstices of the fabric reinforcement layer. Such material may even migrate and appear on the outer surface of the fabric layer. When cooled, any such material present on the outer fabric surface of the belt at the splice represents an irregularity that, when contacting a mating pulley surface, can cause an undesired squeaking or chirping noise. This noise may be severe and can be misinterpreted as a functional defect in the belt. Secondly, the coefficient of friction of the belt base thermoplastic material present on the outer surface of the belt at the splice joint is generally higher than desired and the material is not sufficiently wear resistant. The splice joint may consequently be susceptible to a higher than desired rate of wear at the joint. The industry, therefore, is in need of a splice joint and method that eliminates the noise resulting from thermoplastic material migration through the fabric layer to a pulley-encountering side of the belt. The solution should further result in a belt having desired frictional characteristics across the splice joint and provide a high level of wear resistance at the splice joint.

SUMMARY OF THE INVENTION

In accordance with the practice of the present invention there is provided a splice joint for joining first and second synchronous drive belt ends. The drive belt is of a type comprising a reinforcement material layer covering a base layer formed from a first thermoplastic material. The joint comprises a fused portion of the base layer of the first and second belt ends that define a splice region and at least one coating layer of thermoplastic material overlapping the reinforcement layer of the end portions in the splice region. The coating layer is comprised of a second elastomeric material intended to melt and penetrate into interstices of the reinforcement material layer while within the mold press. Migration of the base layer material through the reinforcement material layer to the pulley-engaging surface is thereby inhibited.

In accordance with another aspect of the invention, the coating layer is composed of polyethylene having low friction and high wear resistance. Another aspect of the invention is to provide at least a second coating layer wherein the first coating layer may be comprised of low density polyethylene and the outer, secondary layer, high density polyethylene. The first coating layer is situated to penetrate the interstices of the fabric material while the second layer is optimally composed to provide the desired friction and wear resistance at the splice seam. In accordance with a further aspect of the invention, a method of forming the splice joint is provided comprising the steps of positioning the first and second end portions of the belt or belts within a mold press having a heating element; at least partially overlapping the reinforcement layers of the first and second belt ends with a sheet of at least one coating layer of a second elastomeric material; elevating the temperature of the coating layer to a melt condition to flow into the reinforcement layer material interstices; melting the base layers of the first and second belt end portions to fuse together; and cooling the coating and fused base layers. The sequential melting of the coating layer and the base layer may be effected by selection of materials having the desired melt temperature properties and/or locating the coating layer closest to the heating surface of the mold to allow the coating layer to heat and melt prior to the melting of the base layer.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
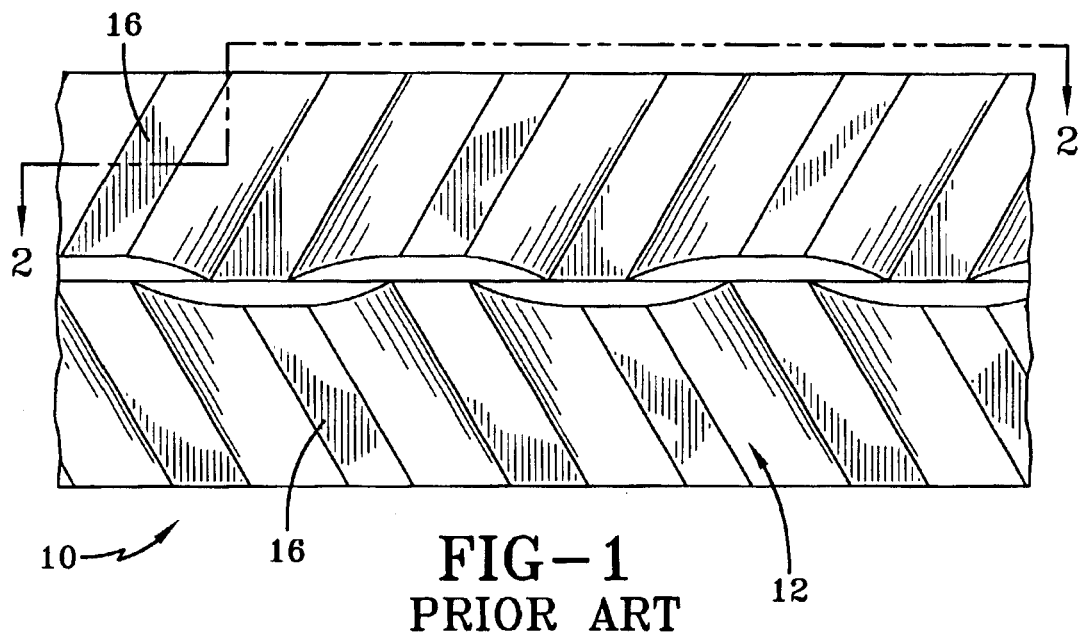
FIG. 1 is a bottom plan view of a portion of a prior art synchronous drive belt of a type utilized in the present invention.
Figure 2:
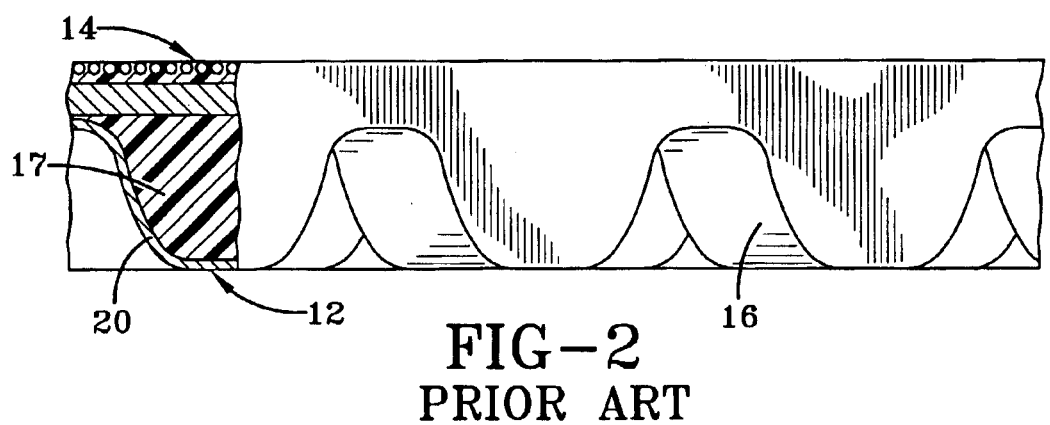
FIG. 2 is a side view partly in section taken along the line 2—2 of FIG. 1.
Figure 3:
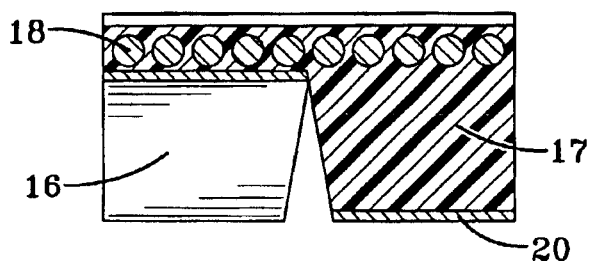
FIG. 3 is a transverse cross-sectional view of the belt taken along line 2—2 of FIG. 2.

The drawings illustrate a synchronous drive belt 10 of a type in use in conventional drive systems such as in automotive transmission applications. A belt 10 such as shown in FIGS. 1–3 includes a toothed surface 12 and a planar opposite untoothed surface 14. Spaced apart along the surface 12 are a series of drive teeth 16. The belt is made of a resilient elastomer base layer 17 typically formed of a plastic resin such as polyurethane. The belt 10 is also typically reinforced with a longitudinal tensile member 19 made up of a plurality of cords 18 of a high elastic modulus. Such cords may be made from glass fiber, carbon fiber, steel, polyester, high tenacity rayon or, preferably, steel. Such a belt is disclosed in U.S. Pat. No. 5,209,705, incorporated by reference herein.

The tooth surface 12 or the belt 10 may be reinforced with a layer 20 of abrasion resistant fabric such as nylon. The fabric includes interstices (not shown) between woven fibers that extend through the fabric from one side to the opposite side. The fabric layer 20 resists abrasion that would otherwise damage or destroy the belt prematurely. The elastomer base layer 17 may be any one of those known to be suitable for use in such belts, e.g., polyurethane, NBR, IIR, SBR, CSM, EPDM, other thermoplastic elastomers and other polymer alloys. The belt 10 may have adjacent rows of teeth 16 or a single row of teeth if required or desired. Teeth 16 may be uniformly or non-uniformly spaced apart in the longitudinal direction.

Figure 4:
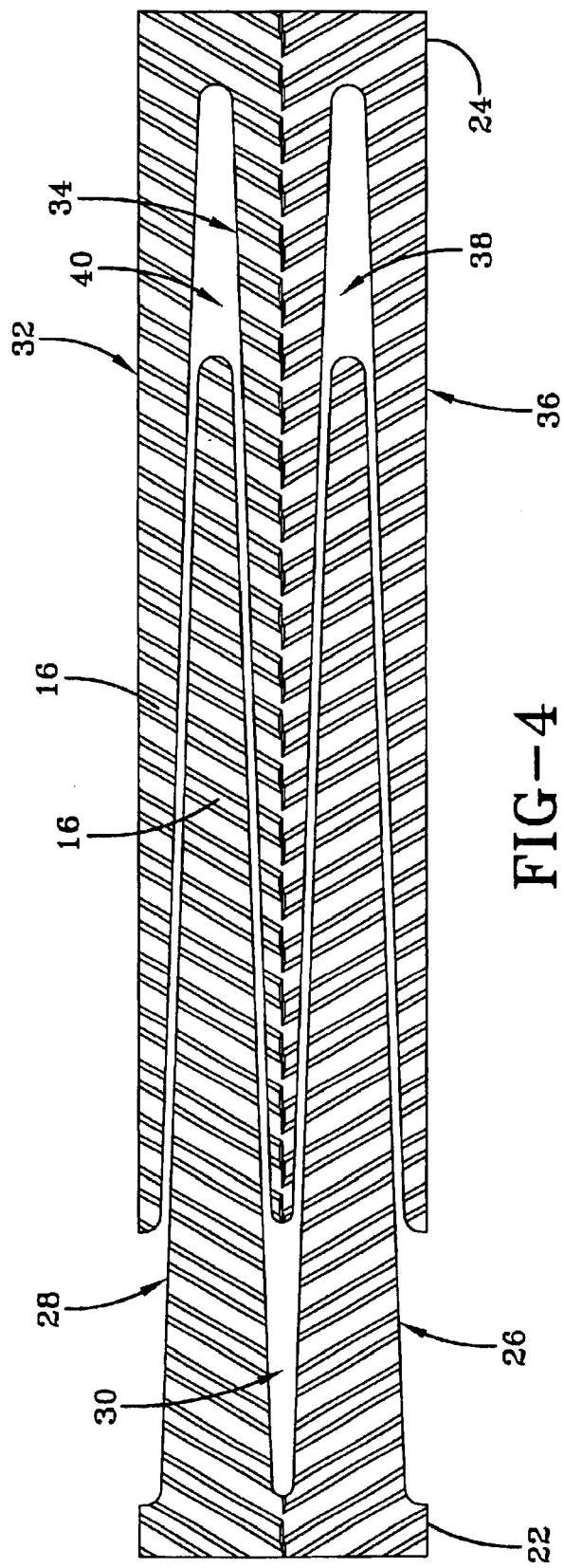
FIG. 4 is a top plan view of opposed ends of a belt according to FIG. 1 prepared and positioned for a splicing procedure of the present invention.

The belt 10 is generally formed in specified lengths. In applications requiring a belt loop, such as conveying applications, the ends of a belt length must be spliced together. Further, in the field repair of existing belts or belt loops, it may also become necessary to splice opposed ends of a belt together in a splicing procedure. Consequently, a splicing procedure has been proposed and employed in which the ends of a single belt or opposed belts are fused together in a splicing operation. The ends of a belt or belts that are to be spliced into an endless or loop configuration are preliminarily prepared by cutting finger patterns in the ends to be joined. The fingers may take the form of elongated chevrons or square castellations, patterns known in the art. A representative preparatory configuration of belt ends to be spliced is shown in FIG. 4. With reference thereto, two belt ends 22, 24 are brought into opposed alignment. The ends 22, 24 may be opposite ends of a single belt or ends of separate belts. End 22 is prepared in conventional manner to provide two fingers 26, 28 spaced apart by a slit 30. End 24 is prepared having fingers 32, 34, and 36 separated respectively by slits 38, 40. The two ends 22, 24 are overlapped with the fingers of one belt end interfitting into the slits of the opposite belt end. The teeth 16 of the one belt end align with the teeth of the opposite.

Figure 5:
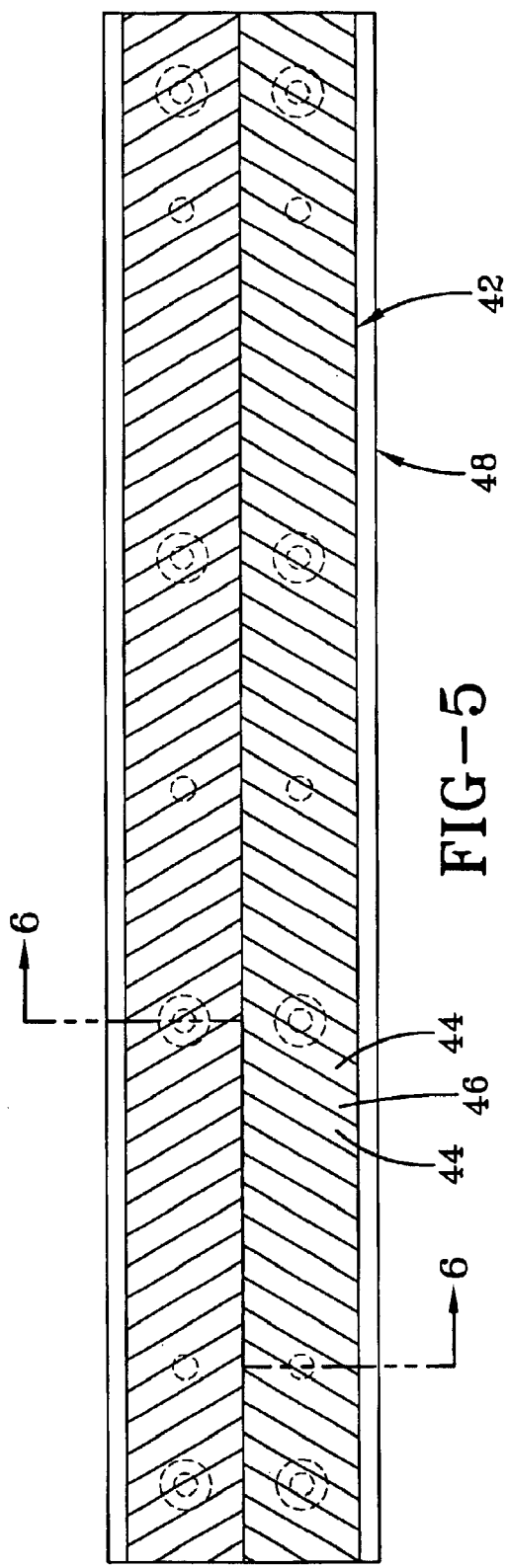
FIG. 5 is a top plan view of a mold top plate component configured to effect a synchronous belt splice.
Figure 6:
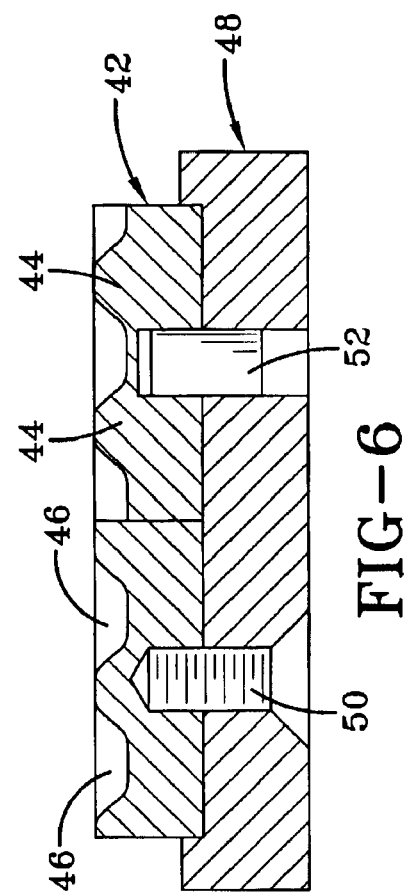
FIG. 6 is a transverse section view through the mold top plate component of FIG. 5 taken along the line 6—6.

With reference to FIGS. 4, 5, and 6, a splice mold of a type commonly used to fuse interfitted belt ends configured as described above is shown. The splice mold comprises an elongate, generally rectangular mold base plate 42 having a series of teeth 44 and cavities 46 formed therein patterned after the interfit belt ends 22, 24 shown in FIG. 4. Other belt teeth patterns known in the art may be employed and the mold base plate 42 will be configured accordingly. The base plate 42 mounts to a support plate 48 by means of bolts 50 and dowel pins 52.

Figure 7:
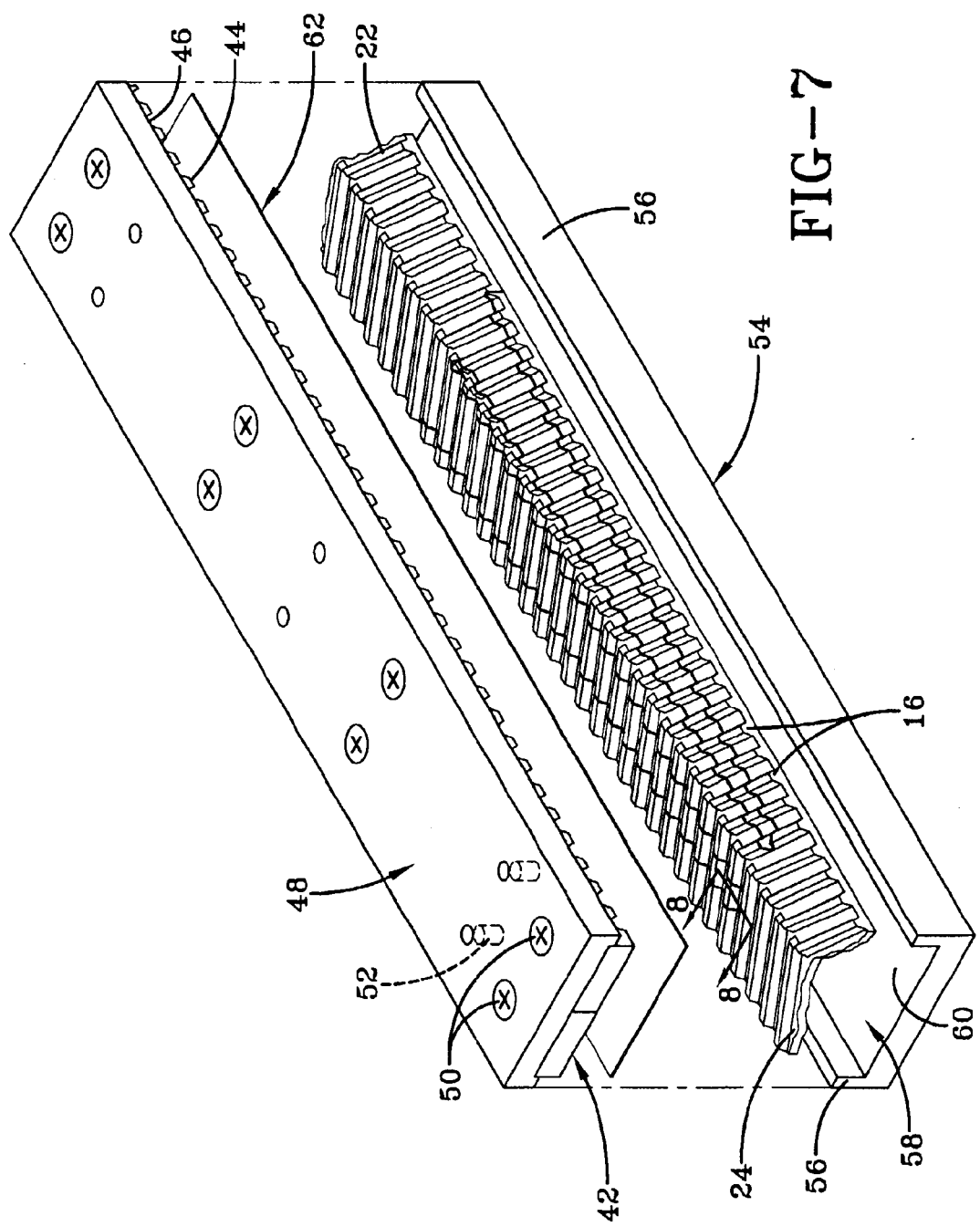
FIG. 7 is an exploded left front perspective view of a mold and synchronous belt ends positioned within the mold prior to initiation of a splice procedure.
Figure 8:
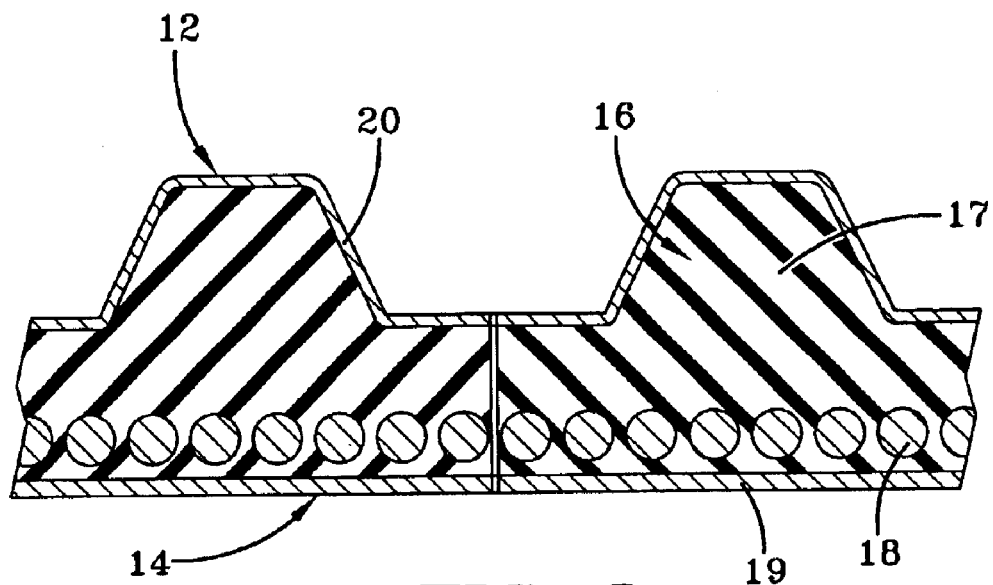
FIG. 8 is a transverse section view through a splice region defined by intertwined synchronous belt ends prior to a splicing operation.

A mold cover plate 54 of elongate, generally rectangular, configuration is provided having upwardly extending opposite edge flanges 56 and an axial channel 58 defined by the edge flanges 56 and a channel floor surface 60. The channel is dimensioned to closely receive and support on surface 60 the interfit belt ends 22, 24 as shown in FIG. 7. A partial transverse section of the belt ends 22, 24 in the pre-splice mutual orientation is shown in FIG. 8. As will be understood from FIGS. 7, 8, pursuant to state of the art splicing methodology, the belt ends 22, 24 having interfit finger end portions define a splicing region. The belt ends 22, 24 are disposed within the channel 58 and upon surface 60 of mold plate 54. Mold plate surface 60 abuts surface 14 of the belt ends and mold plate 42 engages the toothed side of the belt ends as the mold is closed. Once shut, heat is applied via platens through one or the other or both mold plates 42, 54 to the belt ends within the splice region until the base layer 17 of the belt ends achieves a molten state. Pressure is applied to the belt ends 22, 24 simultaneously. Base layer 17 is typically composed of a thermoplastic material such as polyurethane. Once molten, the layers 17 of belt ends 22, 24 fuse. The joint is thereafter cooled leaving the ends 22, 24 in a co-aligned and fused mutual orientation.

While the method described above works well, certain difficulties prevent the attainment of a satisfactory splice. First, because layer 20, generally made of a fabric material, is woven, interstices exist through the material from a bottom side to a top side. As the base layer 17 is subjected to heat within the mold and melts, base layer material migrates through the interstitial openings within layer 20 of the belt ends to an outer surface. The material at the outer surface of the splice belt ends creates a mound or irregularity. When the fused belt is then placed into service, contact between a pulley or sprocket and the residue material along the toothed surface of the belt in the splice region occurs. Such contact can result in an unpleasant noise that is undesirable to the user. The noise thus created can also be misinterpreted by the user as a defect in the belt. In addition, the material of the base layer 17 is may have a coefficient of friction that causes residue material at the splice joint to wear at an unacceptably high rate. Premature failure of the belt at the splice joint may result.

Figure 9:
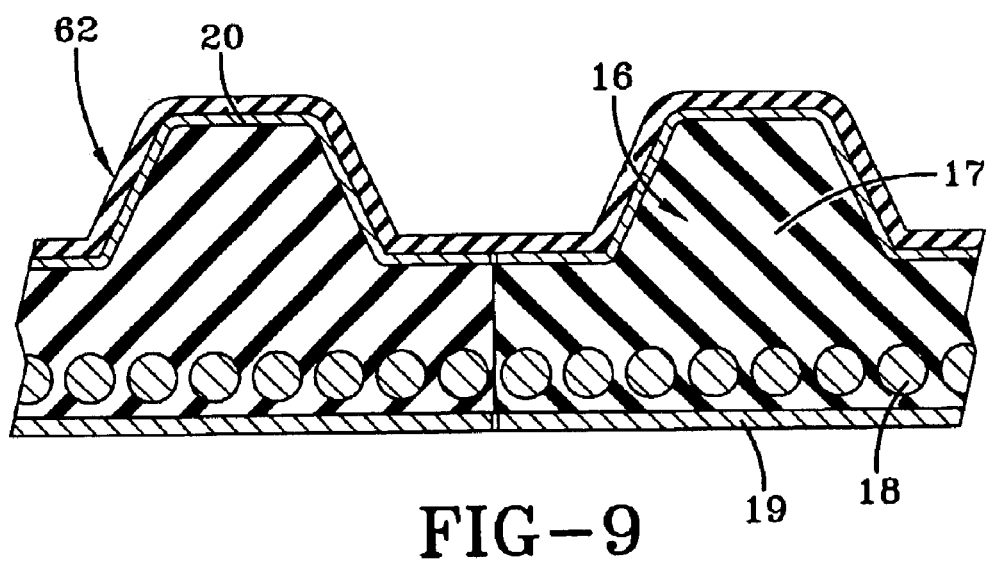
FIG. 9 is a transverse section view through the splice region of FIG. 8 subsequent to the splicing procedure and showing the cover layer over the splice joint.

Pursuant to the present invention, therefore, with reference to FIGS. 7, 8, and 9, an elongate cover sheet or coating layer of material 62 is interposed between the ends 22, 24 and the plate 42 within the mold. The sheet 62 preferably is composed of a material having a melting temperature less than the material comprising belt base layer 17. A suitable material for sheet 62 is polyethylene (may be high or low molecular weight). The sheet 62 is positioned over the toothed surface of the interfit belt ends 22, 24 within the splice region. The mold is then closed and heat and pressure applied as described previously. Within the mold, the material comprising sheet 62 melts first and invades the interstitial spaces within belt layer 20. The material of sheet 62 so located blocks a migration of the base layer material 17 up through the fabric layer 20 to the outer surface of the splice. Upon cooling, the material of sheet 62 covers the splice joint as seen in FIG. 9. The material from which cover sheet 62 is formed is selected to provide certain functional attributes. First, as described above, the material invades the fabric layer of the belt during the mold procedure to block the belt base layer material. Secondly, the coefficient of the material selected to form the cover sheet 62 may be selected so that the splice joint will not suffer from premature wear. In addition, the material comprising 62, such as polyethylene, is generally softer than the material of belt layer 17 and will not cause an undesirable noise when riding over a pulley or sprocket.

Once cooled, the polyethylene of coating layer 62 located within the interstices mechanically bonds to the fabric layer 20. Thus, the resulting splice has a layer of polyethylene over the facing fabric. The polyethylene forms a low friction, wear resistant surface that, when engaging a pulley in a field application, will not cause an undesirable noise.

Melting the cover layer 62 prior to melting the belt base layer 17 in the manner described may be effected by appropriate selection of material, i.e. selecting a material having a lower melt point. An alternative method of melting the cover layer 62 first is to position the mold of FIG. 7 relative to the heat source such that thermal energy is conducted to the layer 62 within the mold before base layer 17. A heat source, for example, located proximate the toothed surface of ends 22, 24 within the mold cavity would act to heat cover layer 62 before melting base layer 17. Consequently, the layer 62 would achieve a molten state prior to layer 17 and fill the fabric gaps as desired.

While the cover sheet 62 is shown as a single, unitarily formed layer, the invention is not intended to be so restricted. If desired, multiple layers formed from differing materials having different melt and frictional properties may be layered and substituted for unitary cover sheet 62. For example, without any intention to limit, sub-layers of high density polyethylene and low density polyethylene may be combined to form the cover layer 62. The outermost disposed sub-layer may be selected for frictional and wear attributes because of anticipated post-splice contact with a pulley or sprocket. The innermost sub-layer may be selected to optimize melt and flow characteristics for the purpose of filling interstitial gaps in the fabric layer 20 during the splicing procedure and bonding to the facing fabric when cooled.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A splice joint connecting first and second end portions of one or more drive belts of a belt type comprised of a reinforcement material layer covering a base layer formed from a first elastomeric material, the splice joint comprising:
    fused elastomeric base portions of first and second drive belt ends defining a splice region; and
    at least one coating layer at least partially overlapping the reinforcement material layer of the first and the second drive belt end portions and spanning ends of the first and second drive belt end portions in the splice region, the coating layer comprised of a second elastomeric material having a higher melt temperature than the base layer first elastomeric material whereby allowing the coating layer to achieve a molten state prior to the base layer within the splice region.

2. A splice joint according to claim 1, wherein the belt base material is polyurethane and the coating layer material is polyethylene.

3. A splice joint according to claim 1, wherein the belt base first elastomeric material has a higher melt temperature than the coating layer second elastomeric material.

4. A splice joint according to claim 1, wherein the reinforcement material layer includes interstices at least partially filled by the molten coating layer second elastomeric material in the splice region.

5. A splice joint according to claim 4, wherein the belt base first elastomeric material is polyurethane and the coating layer second elastomeric material is polyethylene.

6. A splice joint, connecting first and second end portions of one or more drive belts of a belt type comprised of a reinforcement material layer covering a base layer formed from a first elastomeric material, the splice joint comprising:
    fused elastomeric base portions of first and second drive belt ends defining a splice region:
    at least one coating layer at least partially overlapping the reinforcement material layer of the first and the second drive belt end portions in the splice region, the coating layer comprised of a second elastomeric material; and
    at least a second coating layer at least partially overlapping the first coating layer in the splice region, the second coating layer is comprised of high density polyethylene and the first coating layer is comprised of low density polyethylene.

7. A splice joint according to claim 6, wherein the first coating layer at least partially fills interstices of the reinforcement material in the splice region.

8. A splice joint connecting first and second end portions of one or more drive belts of a belt type comprised of a reinforcement material layer covering a base layer formed from a first elastomeric material, the joint characterized by a coating layer at least partially overlapping the reinforcement material layer of the first and second drive belt end portions and spanning ends of the first and second drive belt end portions in the splice region, the coating layer comprised of a second elastomeric material having a lower melt temperature and a lower coefficient of friction than the base layer first elastomeric material.

9. A splice joint according to claim 8, further characterized in that the reinforcement material layer includes interstices at least partially filled daring a splice forming procedure by the coating layer material in the splice region.

10. A splice joint according to claim 9 further characterized in that the coating layer material is composed of polyethylene.

11. A splice joint according to claim 10, wherein the reinforcement material is composed of nylon.

12. A method of forming a splice joint connecting first and second end portions of one or more drive belts of a belt type comprised of a reinforcement material layer covering a base layer formed from a first elastomeric material, the method comprising the steps:
    a) positioning the first and second end portions in adjacent relationship to define a splice region;
    b) at least partially overlapping the reinforcement layers of the first and second belt end portions in the splice region with at least a first coating layer comprised of a second elastomeric material, the first coating layer spanning ends of the first and second belt end portions;
    c) elevating the temperature of the coating layer within the splice region to a molten state at a first elevated temperature to at least partially cover the reinforcement layers of the first and second belt end portions in the splice region;

d) elevating the temperature of the elastomeric base layer of the first and second belt end portions to a molten state at a second elevated temperature that is relatively higher that the first elevated temperature to at least partially fuse the belt end portions together in the splice region; and e) cooling the coating layer and the fused belt end portion base layers to a solid state within the splice region.

13. A method according to claim 12, further comprising the step of penetrating interstices of the reinforcement layer with molten coating layer material within the splice region.

14. A method according to claim 12, wherein the elastomeric base of the first and second drive belt end portions is comprised of polyurethane and the cover layer is comprised of polyethylene.

15. A method according to claim 12, wherein the first and second belt end portions comprise opposite ends of a common belt joined to form a continuous loop.

16. A method of forming a splice joint connecting first and second end portions of one or more drive belts of a belt type comprised of a reinforcement material layer covering a base layer formed from a first elastomeric material, the method comprising the steps:

a) positioning the first and second end portions in adjacent relationship to define a splice region;

b) at least partially overlapping the reinforcement layers of the first and second belt end portions in the splice region with at least a first coating layer comprised of a second elastomeric material;

c) elevating the temperature of the coating layer within the splice region to a molten state to at least partially cover the reinforcement layers of the first and second belt end portions in the splice region;

d) elevating the temperature of the elastomeric base layer of the first and second belt end portions to a molten state to at least partially fuse the belt end portions together in the splice region; and e) cooling the coating layer and the fused belt end portion base layers to a solid state within the splice region; and wherein the coating layer achieves a molten state prior to the elastomeric base layer of the first and second belt end portions within the splice region.

17. A method of forming a splice joint connecting first and second end portions of one or more drive belts of a belt type comprised of a reinforcement material layer covering a base layer formed from a first elastomeric material, the method comprising the steps:

a) positioning the first and second end portions in adjacent relationship to define a splice region;

b) at least partially overlapping the reinforcement layers of the first and second belt end portions in the splice region with at least a first coating layer comprised of a second elastomeric material;

c) elevating the temperature of the coating layer within the splice region to a molten state to at least partially cover the reinforcement layers of the first and second belt end portions in the splice region;

d) elevating the temperature of the elastomeric base layer of the first and second belt end portions to a molten state to at least partially fuse the belt end portions together in the splice region; and e) cooling the coating layer and the fused belt end portion base layers to a solid state within the splice region; and wherein the coating layer is comprised of a relatively low coefficient of friction material relative to the elastomeric base layer of the first and second drive belt end portions.

18. A method of forming a splice joint connecting first and second end portions of one or more drive belts of a belt type comprised of a reinforcement material layer covering a base layer formed from a first elastomeric material, the method comprising the steps:

a) positioning the first and second end portions in adjacent relationship to define a splice region;

b) at least partially overlapping the reinforcement layers of the first and second belt end portions in the splice region with at least a first coating layer comprised of a second elastomeric material;

c) elevating the temperature of the coating layer within the splice region to a molten state to at least partially cover the reinforcement layers of the first and second belt end portions in the splice region;

d) elevating the temperature of the elastomeric base layer of the first and second belt end portions to a molten state to at least partially fuse the belt end portions together in the splice region; and e) cooling the coating layer and the fused belt end portion base layers to a solid state within the splice region; and wherein further comprising the step of at least partially overlapping the first coating layer with at least a second coating layer comprised of relatively high density polyethylene.

19. A method according to claim 18, wherein the first coating layer is comprised of relatively low density polyethylene.

\* \* \* \* \*